United States Patent
Barros et al.

(10) Patent No.: US 11,231,638 B2
(45) Date of Patent: Jan. 25, 2022

(54) PROTECTIVE CASE FOR A MOBILE DEVICE

(71) Applicant: Moment Inc, Seattle, WA (US)

(72) Inventors: Marc Barros, Seattle, WA (US); Erik Hedberg, Sammamish, WA (US); Robert John Lincoln, Seattle, WA (US); Miguel Christophy, Seattle, WA (US); Kent Suzuki, Seattle, WA (US); Josh Baxley, Seattle, WA (US); Phillip Pasqual, Seattle, WA (US); Jessica Livak, Seattle, WA (US); Audrey Louchart, Seattle, WA (US)

(73) Assignee: Moment Inc, Seattle, WA (US)

( * ) Notice: Subject to any disclaimer, the term of this patent is extended or adjusted under 35 U.S.C. 154(b) by 0 days.

(21) Appl. No.: 16/237,498

(22) Filed: Dec. 31, 2018

(65) Prior Publication Data

US 2019/0141221 A1 May 9, 2019

Related U.S. Application Data

(63) Continuation of application No. PCT/US2017/062650, filed on Nov. 20, 2017.
(Continued)

(51) Int. Cl.
*G03B 17/14* (2021.01)
*H04N 5/225* (2006.01)
(Continued)

(52) U.S. Cl.
CPC .............. *G03B 17/14* (2013.01); *A45C 11/00* (2013.01); *G03B 17/565* (2013.01);
(Continued)

(58) Field of Classification Search
CPC ....... G03B 17/14; G03B 17/565; A45C 11/00; H04B 1/3888; H04M 1/0264; H04N 5/2252; H04N 5/2254; H04N 5/2257
See application file for complete search history.

(56) References Cited

U.S. PATENT DOCUMENTS

| 4,314,752 A | 2/1982 | Shizaka |
| 5,036,343 A | 7/1991 | Yamanaka |

(Continued)

FOREIGN PATENT DOCUMENTS

| WO | 2014/040005 A1 | 3/2014 |
| WO | 2018/094367 A2 | 5/2018 |

(Continued)

OTHER PUBLICATIONS

PCT Notification of Transmittal of the International Search Report and the Written Opinion of the International Searching Authority, or the Declaration, for PCT Application No. PCT/US17/62650, report dated Feb. 5, 2018, 24 pages.
(Continued)

*Primary Examiner* — Antoinette T Spinks
(74) *Attorney, Agent, or Firm* — SF Bay Area Patents, LLC; Andrew V. Smith

(57) ABSTRACT

A mobile device case includes a soft protective housing defining a camera-lens aperture and a touchscreen display aperture, and a lens attachment interface including a capture plate protruding into the camera-lens aperture sufficient to overlap a coupling interface of a removable lens assembly along the optical path of the miniature camera module, and a catch to facilitate stable locking coupling of the removable lens assembly in optical alignment with the miniature camera module.

26 Claims, 12 Drawing Sheets

Related U.S. Application Data

(60) Provisional application No. 62/424,387, filed on Nov. 18, 2016, provisional application No. 62/452,943, filed on Jan. 31, 2017.

(51) Int. Cl.
*G03B 17/56* (2021.01)
*H04M 1/02* (2006.01)
*H04B 1/3888* (2015.01)
*A45C 11/00* (2006.01)

(52) U.S. Cl.
CPC ........ *H04B 1/3888* (2013.01); *H04M 1/0264* (2013.01); *H04N 5/2251* (2013.01); *H04N 5/2252* (2013.01); *H04N 5/2254* (2013.01); *H04N 5/2257* (2013.01); *A45C 2011/002* (2013.01); *G03B 2217/002* (2013.01)

(56) References Cited

U.S. PATENT DOCUMENTS

| | | |
|---|---|---|
| 5,426,478 A | 6/1995 | Katagiri et al. |
| 9,197,726 B2 | 11/2015 | Stanimirovic |
| 9,729,770 B2 | 8/2017 | Barros et al. |
| 10,313,568 B2 | 6/2019 | Barros et al. |
| 10,795,240 B2 | 10/2020 | Barros et al. |
| 10,798,279 B2 | 10/2020 | Barros et al. |
| 10,921,687 B2 | 2/2021 | Barros et al. |
| 11,082,596 B2 | 8/2021 | Barros et al. |
| 2004/0202464 A1 | 10/2004 | Miyasaka |
| 2005/0270276 A1 | 12/2005 | Sugimoto et al. |
| 2006/0177206 A1* | 8/2006 | Takanashi .............. G03B 17/08 396/27 |
| 2007/0048470 A1 | 3/2007 | Zadesky et al. |
| 2007/0049340 A1 | 3/2007 | Wang |
| 2007/0268371 A1 | 11/2007 | Misawa et al. |
| 2007/0280677 A1 | 12/2007 | Drake |
| 2008/0002968 A1 | 1/2008 | Arai |
| 2009/0109558 A1 | 4/2009 | Schaefer |
| 2009/0169198 A1 | 7/2009 | Chang |
| 2009/0181729 A1 | 7/2009 | Griffin, Jr. et al. |
| 2012/0236425 A1 | 9/2012 | O'Neill |
| 2012/0275025 A1 | 11/2012 | Parril |
| 2012/0282977 A1 | 11/2012 | Haleluk |
| 2013/0107109 A1 | 5/2013 | Yang |
| 2013/0127309 A1 | 5/2013 | Wyner et al. |
| 2013/0130753 A1 | 5/2013 | Springer |
| 2013/0177304 A1 | 7/2013 | Chapman et al. |
| 2013/0267283 A1 | 10/2013 | Guzman |
| 2014/0071547 A1 | 3/2014 | O'Neill |
| 2014/0071548 A1 | 3/2014 | Sanford |
| 2014/0072362 A1 | 3/2014 | Hyers |
| 2014/0078594 A1 | 3/2014 | Springer |
| 2014/0128132 A1 | 5/2014 | Cox, III |
| 2014/0132832 A1 | 5/2014 | Adams et al. |
| 2014/0267882 A1 | 9/2014 | O'Neill et al. |
| 2015/0002950 A1 | 1/2015 | O'Neill et al. |
| 2015/0015780 A1 | 1/2015 | Graham |
| 2015/0042877 A1 | 2/2015 | O'Neill et al. |
| 2015/0138701 A1 | 5/2015 | Sikka |
| 2015/0194833 A1 | 7/2015 | Fathollahi et al. |
| 2015/0326788 A1 | 11/2015 | Tsuge |
| 2015/0355527 A1 | 12/2015 | Takahashi et al. |
| 2015/0365573 A1 | 12/2015 | Kim et al. |
| 2016/0014318 A1 | 1/2016 | Okabe et al. |
| 2016/0124290 A1 | 5/2016 | Bergreen et al. |
| 2016/0139493 A1 | 5/2016 | Johansson et al. |
| 2016/0181580 A1 | 6/2016 | To et al. |
| 2016/0216477 A1 | 7/2016 | Barros et al. |
| 2016/0254837 A1 | 9/2016 | Rayner |
| 2017/0099419 A1 | 4/2017 | Barros et al. |
| 2017/0223242 A1 | 8/2017 | Barros et al. |
| 2017/0261182 A1 | 9/2017 | Wang |
| 2018/0027156 A1 | 1/2018 | Barros et al. |
| 2019/0158642 A1 | 5/2019 | Barros et al. |
| 2019/0250415 A1 | 8/2019 | Sasaki |
| 2019/0250487 A1 | 8/2019 | Barros et al. |
| 2019/0320101 A1 | 10/2019 | Lincoln et al. |
| 2020/0029000 A1 | 1/2020 | Barros et al. |
| 2021/0103127 A1 | 4/2021 | Barros et al. |
| 2021/0103205 A1 | 4/2021 | Barros et al. |
| 2021/0240056 A1 | 8/2021 | Barros et al. |

FOREIGN PATENT DOCUMENTS

| | | |
|---|---|---|
| WO | 2018/094369 A1 | 5/2018 |
| WO | 2018/094367 A3 | 3/2020 |

OTHER PUBLICATIONS

PCT Notification Concerning Transmittal of International Preliminary Report on Patentability, Chapter I, including the PCT International Preliminary Report on Patentability, Chapter I, for PCT Application No. PCT/US17/62650, report dated Feb. 25, 2020, 11 pages.

Non-Final Rejection, dated Dec. 30, 2019, for U.S. Appl. No. 16/314,622, filed Dec. 31, 2018.

Non-Final Rejection, dated May 4, 2020, for U.S. Appl. No. 16/237,461, filed Dec. 31, 2018.

PCT Notification of Transmittal of the International Search Report and the Written Opinion of the International Searching Authority, or the Declaration, for PCT Application No. PCT/US17/62653, report dated Jan. 25, 2018, 16 pages.

PCT Notification Concerning Transmittal of International Preliminary Report on Patentability (Chapter I of the Patent Cooperation Treaty) (PCT Rule 44bis.1(c)), for PCT Application No. PCT/US17/62653, report dated May 31, 2019, 13 pages.

Notice of Allowance, dated Jul. 14, 2020, for U.S. Appl. No. 16/314,622, filed Dec. 31, 2018.

Notice of Allowance, dated Oct. 26, 2020, for U.S. Appl. No. 16/237,461, filed Dec. 31, 2018.

Communication regarding the transmission of the European search report; European search opinion; Information on Search Strategy; and Supplementary European search report, dated Jul. 18, 2018, for European patent application No. 16743894.4, filed Jan. 25, 2016, 8 pages.

Non-Final Rejection, dated Sep. 18, 2020, for U.S. Appl. No. 16/364,174, filed Mar. 25, 2019.

Notice of Allowance, dated Mar. 31, 2021, for U.S. Appl. No. 16/364,174, filed Mar. 25, 2019.

* cited by examiner

PROTECTIVE CASE FOR A MOBILE DEVICE

PRIORITY AND RELATED APPLICATIONS

This application is a Continuation of PCT application ser. no. PCT/US17/62650, filed Nov. 20, 2017; which claims priority to each of U.S. provisional patent applications ser. nos. 62/424,387, filed Nov. 18, 2016, and 62/452,943, filed Jan. 31, 2017.

This application is related to U.S. provisional patent applications Ser. Nos. 62/424,318, filed Nov. 18, 2016 and 62/452,951, filed Jan. 31, 2017; and this application is related to U.S. Pat. Nos. 9,729,770, 9,467,608, 9,781,319, and 9,596,393, and to U.S. patent applications Ser. Nos. 29/592,638, filed Jan. 31, 2017, Ser. No. 29/593,579, filed Feb. 9, 2017, Ser. No. 29/593,576, filed Feb. 9, 2017, Ser. No. 15/671,076, filed Aug. 7, 2017, PCT/US16/14652, filed Jan. 25, 2016, Ser. No. 15/289,094, filed Oct. 7, 2016, published as US 2017-0099419 A1, Ser. No. 15/715,189, filed Sep. 26, 2017, and Ser. No. 15/437,439, filed Feb. 20, 2017, published as US 2017-0223242 A1.

All of the above priority applications and related patents and patent applications are incorporated by reference.

BACKGROUND

Embedded devices such as mobile phones, including Android, Apple and Samsung phones, are often equipped with miniature camera modules. These miniature camera modules typically include only a single fixed-focus lens and an image sensor. Some of these devices have software applications downloaded or otherwise stored on them that permit limited choices in pre-capture camera settings, such as exposure duration and flash setting, and some provide limited post-capture image editing capabilities designed to compensate for the inadequacy of the built-in optics. Image processing software is however incapable of providing real images of objects that are too close or too far from the device, or of scenes including multiple objects that require greater depths of field in order to capture them without intolerable amounts of defocus blur or of scenes with moving objects without excessive motion-related blur, among other imaging issues. It is therefore desired to be able to supplement the built-in optics of a miniature camera-enabled embedded device with one or more additional lenses or other optics.

Auxiliary lenses for mobile smartphones with camera modules are typically clipped onto the smartphone. These clip-on lenses put mechanical stresses on the smartphone directly along the optical path of the camera modules that can result in distortional stresses that can mechanically weaken the device and can distort the optical quality of captured images. Clip-on lenses are also unstable and often move laterally when smartphone precapture settings are being adjusted, during image capture and when the smartphone is being temporarily stored in a bag or pocket or on a table top. It is desired to have a way to attach an auxiliary lens to a mobile device in stable alignment with the optics of the built-in camera module.

Smartphones are used for capturing digital images in a variety of situations. In the past, a person operating a camera could not be in the picture because of the unwieldy nature of the camera and the camera-object distances typically involved in capturing an entire scene that may include multiple persons and perhaps background buildings or other objects. Some conventional cameras include a built-in delay to allow the camera operator to quickly duck into the scene that is based on a predetermined time duration or that uses face recognition techniques wherein image capture awaits a smiling camera operator to enter the scene. Either way, it is difficult to spontaneously, stably and accurately position and direct a camera to capture a picture without being held by a human operator. Today, "selfies" are more commonly made possible because smartphones and other mobile devices with built-in miniature camera modules permit front-side display of the precapture image and these mobile devices are typically lightweight enough to hold in one hand while an image is captured. Nonetheless, it is desired to be able to more easily handle a mobile device during a one-handed image capture.

DETAILED DESCRIPTION OF THE EMBODIMENTS

Embodiments include modifications and improvements of embodiments described in the above-identified patents and patent applications. Further embodiments are illustrated in the attached drawings figures. A case for a mobile camera-enabled device may include a lens interface that uses spring loaded coupling for locking a removable, attachable lens into place along the optical path of the camera module of the mobile device.

Figure 1:
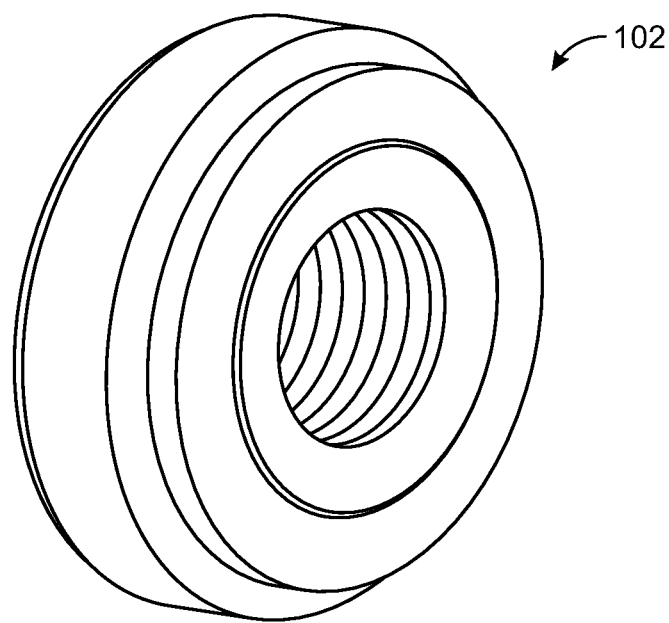
FIGS. 1 and 2 illustrate in front and rear perspective views an example attachable auxiliary lens 102 configured for coupling with a lens attachment interface of a case for a mobile camera-enabled device in accordance with certain embodiments.
Figure 2:
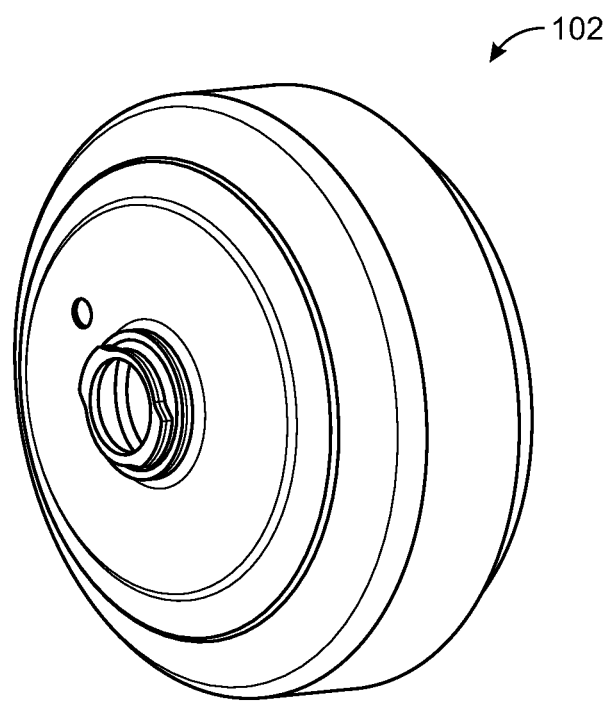

FIGS. 1 and 2 illustrate in front and rear perspective views an example attachable auxiliary lens 102 configured for coupling with a lens attachment interface of a case for a mobile camera-enabled device in accordance with certain embodiments. Lens types may include wide angle, zoom, microscope, or telescoping lens assemblies, and/or multiple lenses, multiple lens groups that may be translatable, rotatable or otherwise adjustable or fixed relative to built-in components such as an image sensor of a mobile device and/or relative to other fixed or adjustable, attachable and/or removable, lens groups that may form an optical assembly capable of imaging objects and scenes onto the image sensor that have far superior image quality or image capture characteristics compared with images that may be captured by a built-in camera module with a single fixed lens, for example, of a conventional mobile device. The lens 102 may include an aspherical lens surface that may be configured for compensating or correcting higher order aberrations such as astigmatism, wide angle distortion and/or oblique aberrations.

Figure 3:
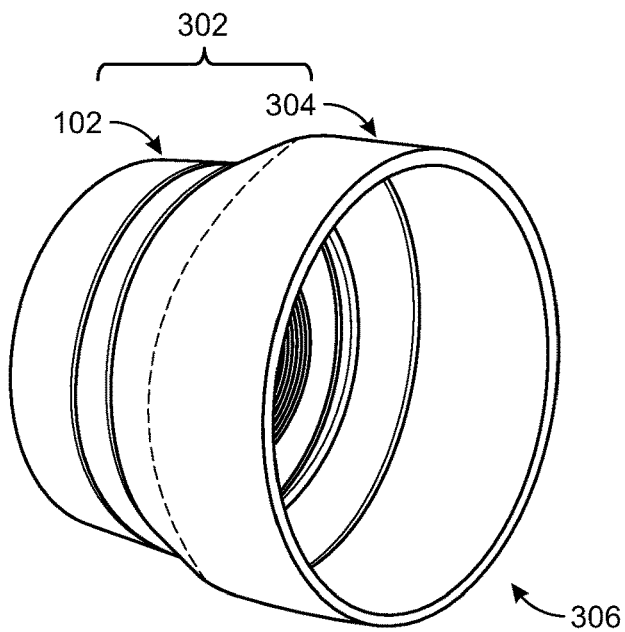
FIG. 3 illustrates an example of an attachable auxiliary lens assembly 302 that includes an auxiliary lens 102 and a hood 304 in accordance with certain embodiments.

FIG. 3 illustrates an example of an attachable auxiliary lens assembly 302 that includes an auxiliary lens 102 and a hood 304 in accordance with certain embodiments. The hood 304 may be otherwise configured, e.g., as illustrated and described in multiple examples including those shown and described with reference to FIGS. 15D, 15I, 15K, 38D, 38E, 38F, 39C in U.S. Pat. No. 9,467,608 which is incorporated by reference. The attachable and removable lens 302 illustrated in the example of FIG. 3 may include an attached or integral hood 304 that appears white, diffusive, and/or significantly translucent or opaque. The hood 304 may enclose a 5 mm to 75 mm length of an optical path from an object-side surface of the auxiliary lens 102 and extending away on the object side of the auxiliary lens 102. The example hood 304 shown in FIG. 3 has a circular or modestly elliptical cross-section that increases linearly or uniformly in diameter, area and/or distance from a center line of the optical path as the distance increases further and further from an object-side surface of the lens 102 on an object side of the lens 102 in a direction away from the image end of the optical assembly. The linear and/or uniform increase in diameter of the hood 304 may also change smoothly or abruptly from a first rate to a second slower rate at a distance from the object-side surface of the lens 102 that is between about a tenth and a half of the total hood height, e.g., at a third, fourth or fifth of the total hood height from the object-side surface of the lens 102 on the object side of the lens 102.

Hoods 304 in accordance with alternative embodiments may include different colors, different degrees of diffusivity, opacity, translucency, transmissivity, absorptivity, reflectivity and/or transparency, different sizes in width and/or height, different gradients of increasing width and/or diameter away from an image end of the optical assembly, and/or multiple gradients and/or straight polygonal, hybrid or curved contoured sizes and shapes. Hoods of various height, width and material composition may be used to reduce the amount of unwanted light impacting the image sensor at extreme angles or otherwise that could significantly impact image quality as noise. An attachable and/or removable auxiliary lens assembly 302 in accordance with certain embodiments may include a hood 304 with a rounded body shape with flat or smooth glass.

Figure 5:
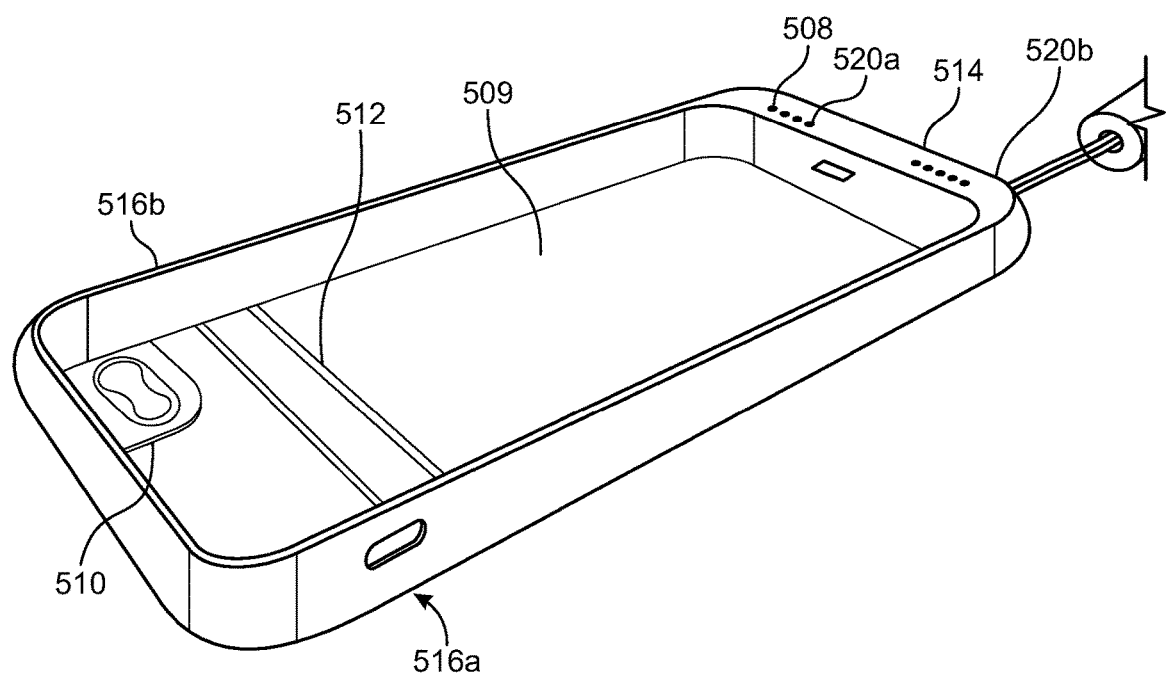
FIG. 5 illustrates a front perspective view of an empty mobile device case 508 in accordance with certain embodiments.

FIG. 5 illustrates a front perspective view of an empty mobile device case 508 in accordance with certain embodiments. The empty case 508 of FIG. 5 defines a recess 509 that is configured in size and shape to securely and comfortably accommodate a mobile device therein such as an iphone or an Android or Samsung device, or another mobile phone or mobile camera-enabled device. Several examples are provided herein of various embodiments of cases that are configured for an iphone, while the advantageous features and benefits described in these example embodiments are generally applicable to mobile devices of various shapes, sizes, component architectures and functional capabilities.

Figure 4:
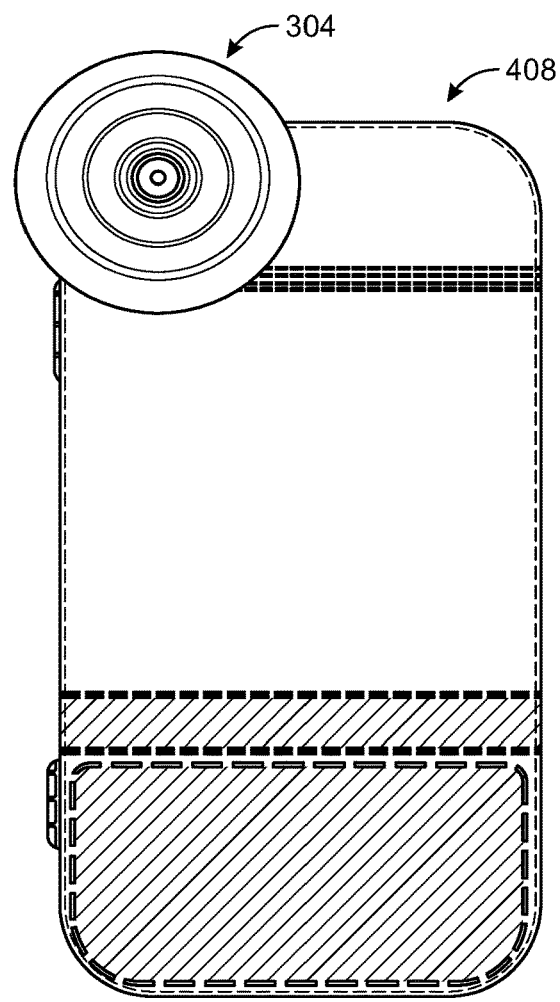
FIG. 4 illustrates an example of a mobile phone case with an attached auxiliary lens including a hood in accordance with certain embodiments.

A mobile device case 508 in accordance with certain embodiments may include a lens attachment interface that also in part or in whole defines a camera aperture or camera-flash aperture. A lens attachment interface 510 may be built into the case 508 or may be defined by an attachable component that may include guides or guiding parts that may provide mechanical or visual direction in placing an attachable and removable hooded lens 304 into position along the optical path of the camera module of a mobile device disposed within a case 508, such as in the example of FIG. 4. A lens attachment aperture 510 in accordance with certain embodiments may be customized for mechanical, electrical and/or optical coupling, and/or for wireless or wired signal coupling, to a particular mobile device or mobile device case and may include one or more stops or filters, and may have a shape designed for coupling with a bayonet interface or other mechanical coupling interface of an auxiliary lens 304. A lens attachment aperture 510 may also serve as an optical clipping aperture, and/or may be configured for otherwise blocking, reflecting, redirecting, spectrally filtering and/or absorbing or trapping light.

A case 508 may be formed from two different materials that may have been melted and cured together or otherwise blended into a single composite material mold, or double-shot injection molded, or that may be disposed in layers of materials that serve different purposes and thus have one or more different properties such as hardness, elasticity, malleability, durability, deformability, texture, density, or combinations of mechanical and thermal, aesthetic, electrical and/or optical properties. For example, a case in accordance with certain embodiments may include a rigid inner layer, e.g., polycarbonate, that has high resistance to being deformed inwardly and significant capacity to maintain its shape under pressure, and a soft elastomeric outer layer that is configured to absorb external impacts by compression in the direction of impact and by spreading laterally away from the impact region such that the inner PC layer experiences a reduced force and is less likely to deform or collapse or become crushed or to otherwise contact or damage the mobile device.

The two or more layers may each be formed from a single uniform, perhaps monochromatic, material as in the example of FIG. 5, that may include a single or composite source material, with or without any volumetric or surface additives, such as glass, metal and/or carbon fibers which may alter one or more aesthetic or mechanical or electrical or thermal properties of one or both material layers of the case 508. A case 508 with two layers may include a rigid inner layer and a soft, elastic, thermoplastic and/or thermoplastic elastomeric outer layer in certain embodiments, while in other embodiments the case 508 may include a soft inner layer and a rigid outer shell or three or more layers. In certain embodiment, a two material layer case 508 may include a rigid inner polycarbonate layer or skeleton and a thermoplastic elastomeric or TPE or TPU outer layer.

The case 508 illustrated in the example of FIG. 5 includes a bendable zone 512 or hinge region 512 that facilitates mobile device insertion and removal by bending a few degrees or 10°, or 20°, or 30° or 45° or less such as to permit bottom-first insertion of the mobile device at the bendable zone 512 followed by sliding along or otherwise translating relative to and/or coplanar with a back wall of the case 508 until the mobile device is fully inserted without relative rotation other than the bending of the case at the bendable zone 512 or hinge region 512. That is, the mobile device and a back wall of the case may remain disposed in approximately coplanar relative disposition during the entire insertion event, thereby preventing bending and gradual weakening of the thin peripheral walls of the case during insertion of the device and ensuring that a connector interface, such as a lightning interface, on the bottom peripheral surface of the mobile device, for receiving charge from a wall outlet or other external power source and/or for exchanging data with an external device, is aligned with a complementary lightning connector 514 protruding into the recess 509 from an inner surface of a bottom wall of the case 508, such as to automatically couple the mobile device to the lightning connector component 514 when the bottom of the mobile device is slid all the way along the length of the case until contact is made with the inner surface of the bottom wall of the case.

Figure 6:
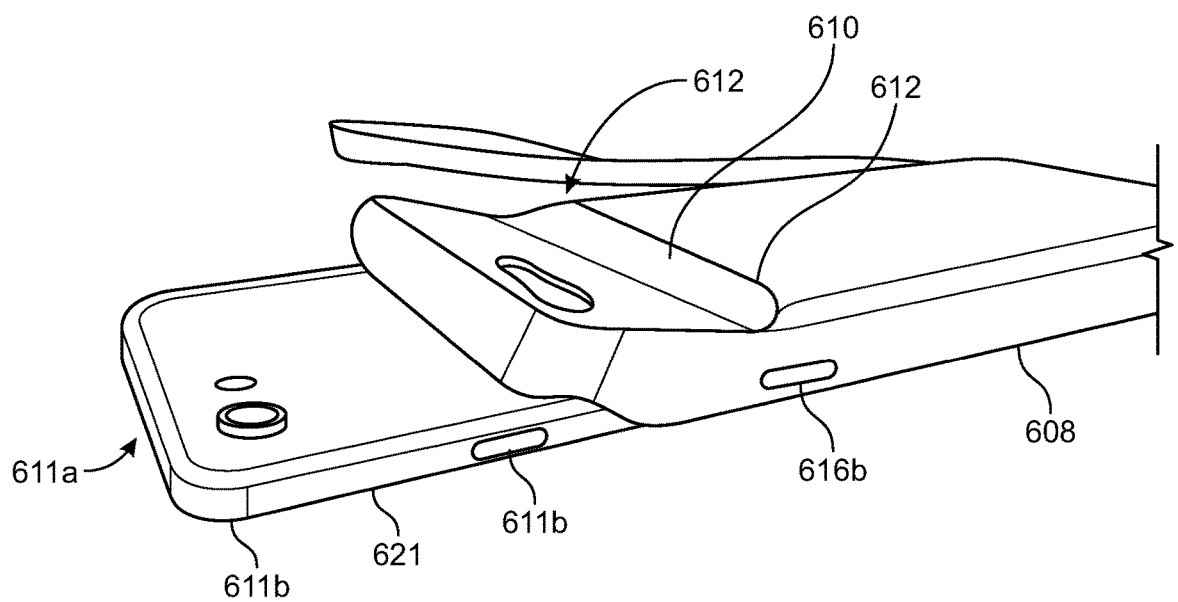
FIGS. 6 and 7 illustrate back perspective views of a mobile phone case with a top section bent a few degrees backward at a bendable zone sufficient for insertion of the mobile device in accordance with certain embodiments.

One or more cutouts 516A as illustrated in the example of FIG. 5, and/or one or more perforated quasi-buttons 616B as illustrated in the example of FIG. 6, may be provided at positions along any of the four peripheral walls to facilitate actuation of an adjacent button or other controller, switch or actuator on the mobile device. Audio openings 520A, 520B are illustrated in FIG. 5, e.g., in two sections on either side of a lightning connector 514. These audio openings 520A, 520B are provided for receiving external sounds, such as from a speaking voice, through an outer front-facing and/or bottom facing surface of a bottom peripheral wall of the case 508 to effectively reach a microphone on the mobile device and/or for expelling sounds from an audio speaker on the mobile device.

The case 608 is shown in back perspective view with a top section bent a few degrees, or several degrees, or 5°-45° backward at a bendable zone 612 or hinge region 612 just sufficient for insertion of the mobile device 621 by sliding the mobile device 621, bottom of device 621 first, from the bendable zone 612 or hinge region 612 until the bottom of the device 621 contacts the inner surface of the bottom wall of the recess 609. In some embodiments, there is no relative rotation of the device 621 relative to the case 608, and instead with the device 621 remains in coplanar juxtaposition with the back wall of the case 608 during the insertion from the bendable zone 612 or hinge region 612 to fully inserted allowing the back wall of the case 608 to return to its flat, planar equilibrium configuration. The bending of the case 608 at the bendable zone 612 by only a few to several degrees, or between 5-45° or between 15-35°, does not cause so much weakening of the case at the bendable zone 612 as to compromise the strength and integrity of the case 608 as a single piece, two layer protective case 608.

In alternative embodiments, the bendable zone 612 or hinge region 612 is very thin or even divides to separated upper and lower sections, respectively, of rigid material above and below the bendable zone 612 or hinge region 612. In these embodiments, the upper region may be bent back or hinged at a greater angle than in other embodiments wherein the bending or hinging is resisted more strongly.

A perforated quasi-button 616B is provided in the example of FIG. 6 at a location that will be adjacent to a mobile device button 617B when the mobile device is fully inserted into the case 608. A camera flash aperture 610 is also defined in the back wall of the case 608 to permit transmission of light from a camera flash 611A through the aperture 610 to illuminate an object or scene and to permit transmission of light reflected from the object or scene to traverse an optical path of the camera module of the mobile device to be focused and captured at the image sensor 611B of the camera module of the mobile device. The camera flash aperture 610 may include a continuous area cutout as in the example of FIG. 6 or may include multiple cutouts such as a first camera cutout and a second, separate flash cutout.

Figure 7:
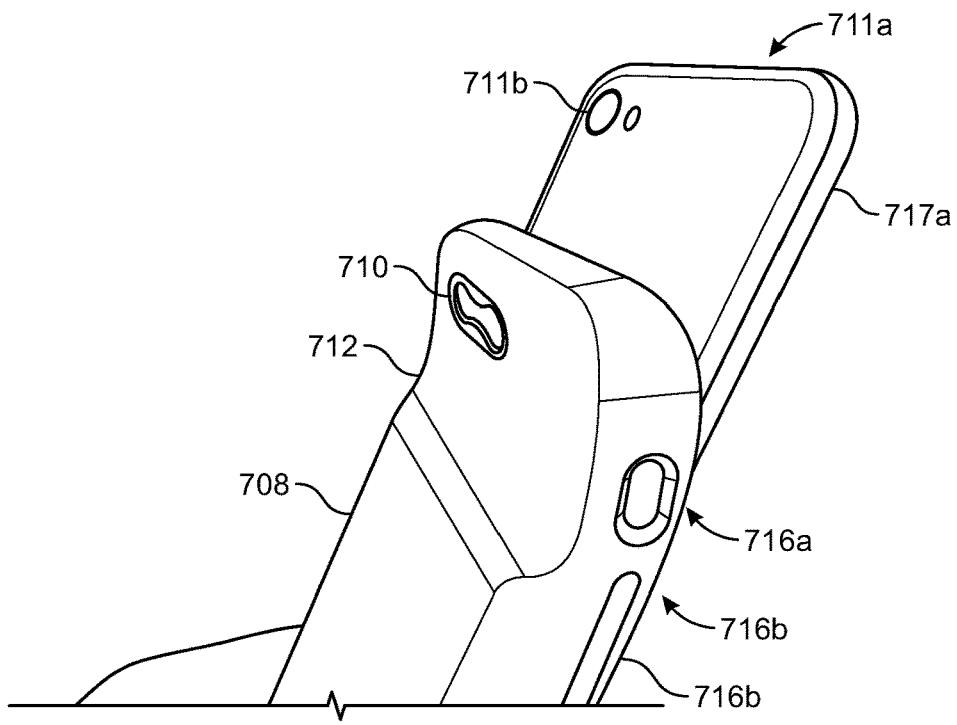

FIG. 7 illustrates a case 708 having a mobile device partially inserted such that the top of the case is rotated a few degrees by hinging at the bendable zone 712. A camera-flash aperture 710 is disposed and configured for advantageous illumination and capture of digital images with the camera module of the mobile device, and also for coupling an attachable auxiliary lens into the optical path of the camera module to enhance one or more imaging characteristics, qualities or capabilities of the camera module 711B of the mobile device. A mobile device button, switch, controller or actuator 717A may be manipulated by the user of the mobile device through the cutout 716A, and a pair of perforated quasi-buttons 716B are shown in FIG. 7 in proximate disposition along a side wall of the case 708 for adjusting a mobile device volume up and down by actuating, respectively, separate up and down volume control buttons on the mobile device.

Figure 8:
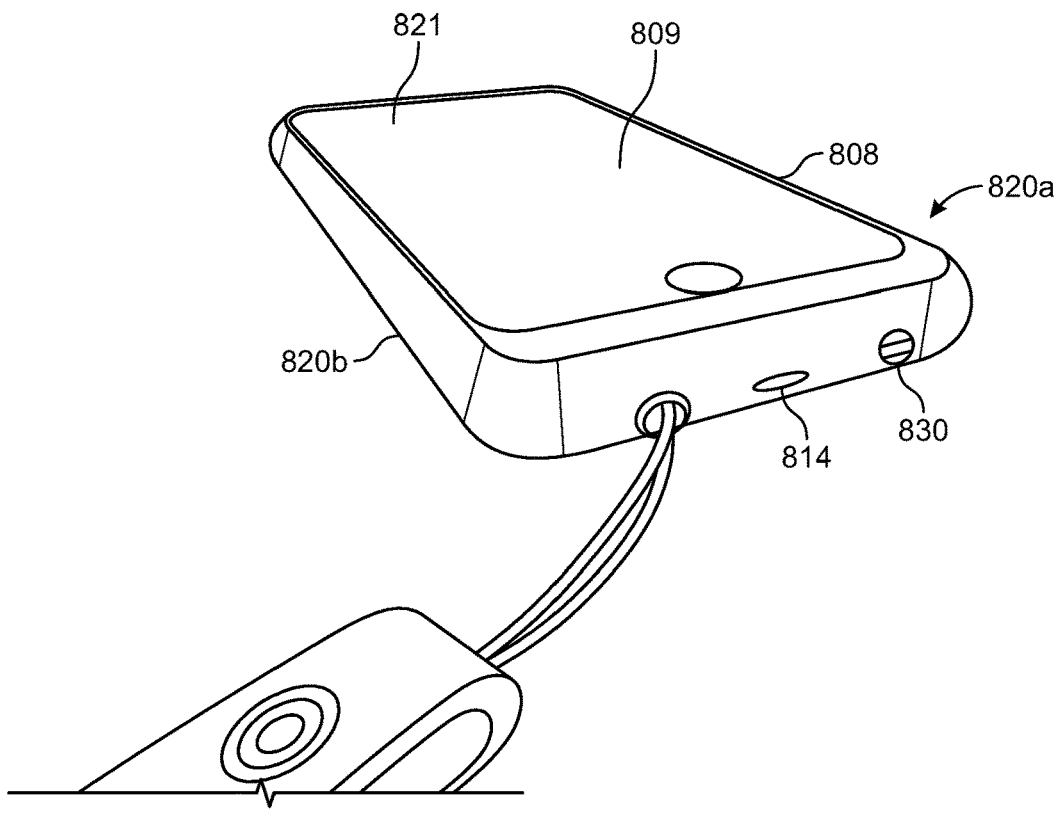
FIG. 8 illustrates a mobile device case that has a mobile device fully inserted into a recess that may be form fit approximately to receive the shape of the back wall and four peripheral walls of the outer housing of the mobile device, in accordance with certain embodiments.

FIG. 8 illustrates a mobile device case 808 that has a mobile device 821 fully inserted into a recess 809 that may be form fit approximately to receive the shape of the back wall and four peripheral walls of the outer housing of the mobile device 821. The case 808 of FIG. 8 defines a window or opening in a front wall of the case 808 in certain embodiments that has at least an approximately same size and shape as a touch screen display on the mobile device which itself occupies substantially the front surface of the mobile device, such that only a thin periphery overlaps the front surface of the mobile device just at the very edges of the mobile device in certain embodiments the extent of overlap is not more than the thickness of the outer wall of the mobile device housing. Alternatively, the case 808 may not have a front wall or front facing surface at all, and instead may have only a back wall and four peripheral side walls. The case 808 defines audio in and/or audio out cavities 820A, 820B in a front-facing strip of surface at the bottom of the case 808 on either side of a lightning connector interface 814. A further audio in and/or audio out cavity 830 is defined in this example embodiment in a bottom facing outer peripheral surface.

Figure 9:
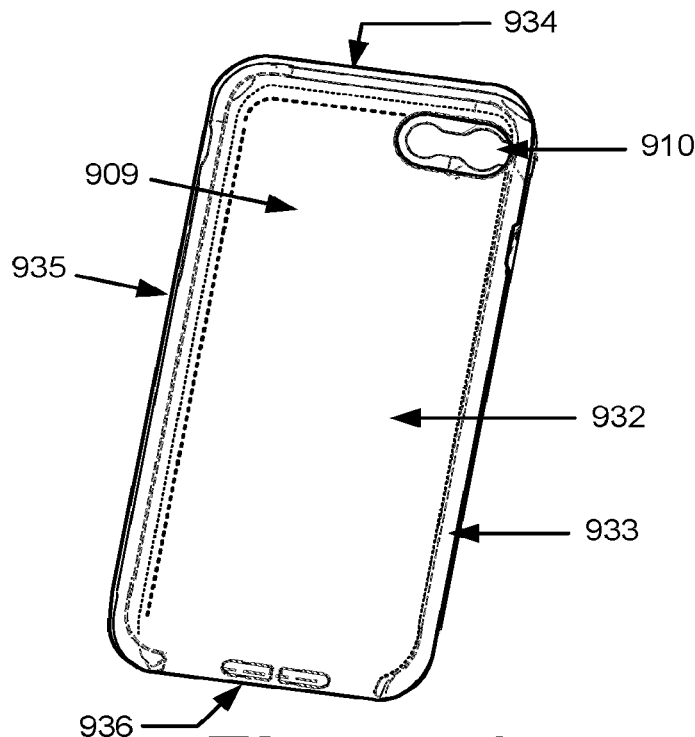
FIGS. 9 and 10 illustrate front and back perspective views, respectively, a rigid material layer component of a mobile device case in accordance with certain embodiments.
Figure 10:
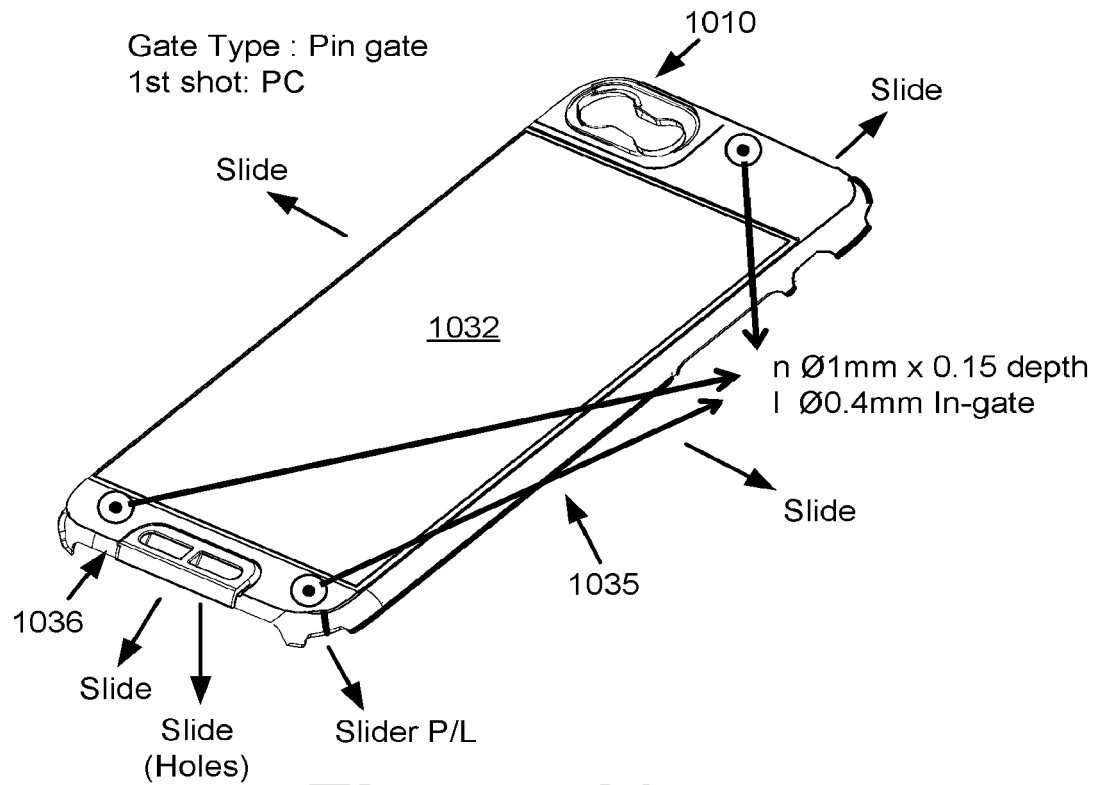

FIGS. 9-10 illustrate front and back perspective views, respectively, of a rigid layer component 932 that may comprise polycarbonate in certain embodiments. The rigid layer component 932 may be configured for a mobile device case that may also include an elastomeric outer layer such as in the examples illustrated at FIGS. 4-8, or for a case that includes an elastomeric inner layer, or for a case that has both inner and outer elastomeric layers, i.e., an elastomeric layer on either side, both front and back sides, of rigid layer 932, or for a case that includes a single interlocking elastomeric component that includes a subset of parts disposed between the rigid layer 932 and the mobile device and a second subset of other parts that are disposed outside the rigid layer 932, i.e. having the rigid layer 932 disposed between the mobile device and the second subset of elastomeric parts.

The rigid layer component 932, 1032 in the examples of FIGS. 9-10, respectively, includes a recess 909 having a size and shape that accommodates, and may form fit, an outer housing size and shape of a particular mobile device, such as an iphone, Android phone, or Samsung phone. The rigid layer component 932, 1032 of FIGS. 9-10, respectively, also defines a camera flash aperture 910, 1010 at a location that corresponds to the locations and shapes and sizes of camera and flash components of the particular mobile device that it is designed to protect. The rigid layer component 932, 1032 of FIGS. 9-10, respectively, includes a peripheral wall that is continuous from the bottom of each long side wall 933, 935/1035 up and across the top peripheral side wall 934 and down to the bottom of the other side wall 935/1035, 933. A bottom peripheral side wall opening 936, 1036 is defined in the rigid layer component 932, 1032 to facilitate insertion of the mobile device into the recess 909 through the opening 936, 1036 at the bottom of a case that includes the rigid layer component 932, 1032.

Figure 11:
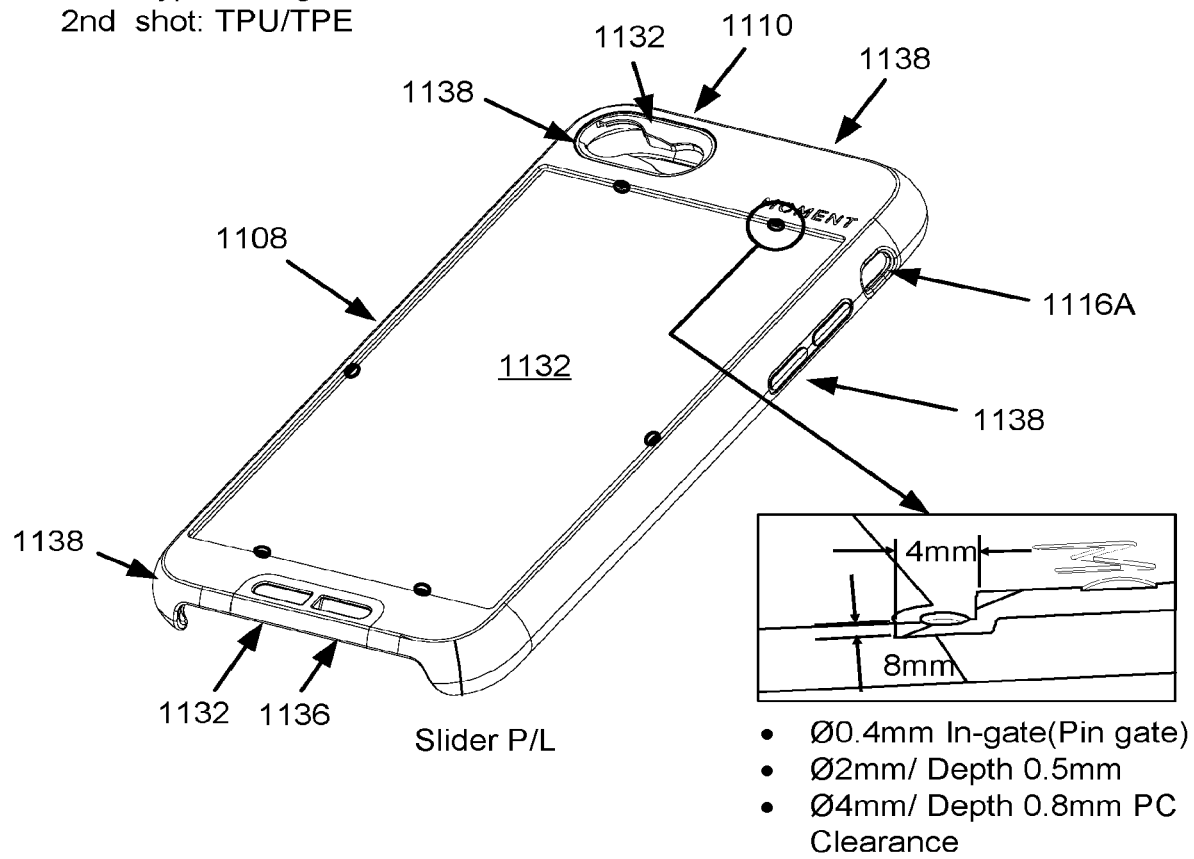
FIG. 11 schematically illustrates an example of a two material layer case including a rigid layer component and an elastomer component or other thermoplastic or other soft material layer component, in accordance with certain embodiments.

FIG. 11 schematically illustrates an example of a two material layer case 1108 including a rigid layer component 1132 and an elastomer component 1138 or otherwise soft material layer component 1138. The soft layer component 1138 in the example of FIG. 11 includes a continuous outer side wall and defines a significant opening in a back wall through which the rigid layer component 1132 can be seen, whereas the cases 408, 508, 608, 708 and 808 in the examples of FIGS. 4-8, respectively, do not define openings in the back wall of the elastomer layer component 1138 other than the camera flash aperture 510, 610, 710.

Figure 12:
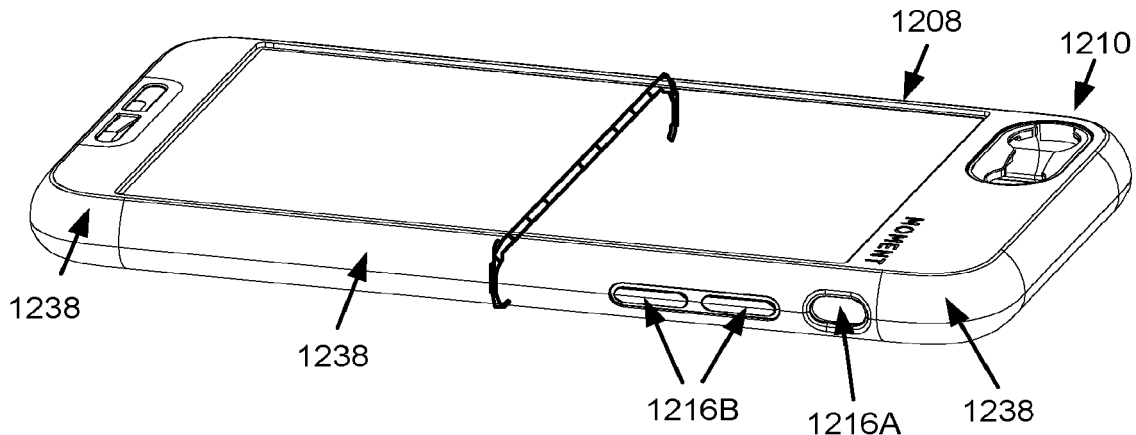
FIG. 12 illustrates another example of a two material layer case including a rigid layer component and a soft layer component in accordance with certain embodiments.

FIG. 12 illustrates another example of a two material layer case 1208 including a rigid layer component 1232 and a soft layer component 1238. A two-cavity camera-flash aperture 1210 is shown that includes a flash cavity and a separate camera cavity. In certain embodiments, the rigid layer component 1232 includes a single camera-flash opening 1210, while the soft layer component 1238 defines separate camera and flash cavities, and also defines an opening covering more than half the area of the back wall of the soft material layer component 1238 .

The single camera-flash opening 1210 in the elastomer layer 1238 is advantageously provided even in embodiments where an underlying rigid layer component 1232 defines separate camera and flash apertures, because the single camera-flash aperture 1210 has an elongated shape that makes the aperture 1210 advantageous in its dual role as auxiliary lens attachment aperture. A bayonet coupling interface is provided in certain embodiments with a protruding edge or an otherwise more or less elongated shape in the plane which is normal to the centerline optical path of the optical assembly. The elongated shape of the aperture 1210 facilitates coupling with an auxiliary lens 102, 304 that includes a bayonet coupling interface component, because a bayonet may be easily passed through the aperture 1210 when the elongated dimensions of the bayonet and the aperture 1210 are aligned. After the bayonet passes through the aperture 1210, the auxiliary lens 102, 304 may be rotated until the elongated bayonet direction becomes aligned with the narrow dimension of the aperture 1210. In this orientation the edges of the aperture 1210 overlap the bayonet edge such that the elongated bayonet edge becomes now interlocked with the overlapping edges of case body material and/or with one or more additional components that may be used to define the edges of the aperture 1210 with special shapes designed for enhancing the alignment precision and mechanical stability of coupling an auxiliary lens 102, 304 into the optical assembly of the mobile device camera module.

In certain embodiments, the edge of aperture 1210 may be coupled with one or more components that further facilitate the optical precision and mechanical stability of alignment of the auxiliary lens 102, 304 with the optical path defined by built-in lens and image sensor components of the camera module of the mobile device. The rigid layer material component 1232 of the example shown in FIG. 12 also defines a cutout 1216A that permits access to a mobile phone button, switch, interface connector and/or interface actuation control.

Figure 13:
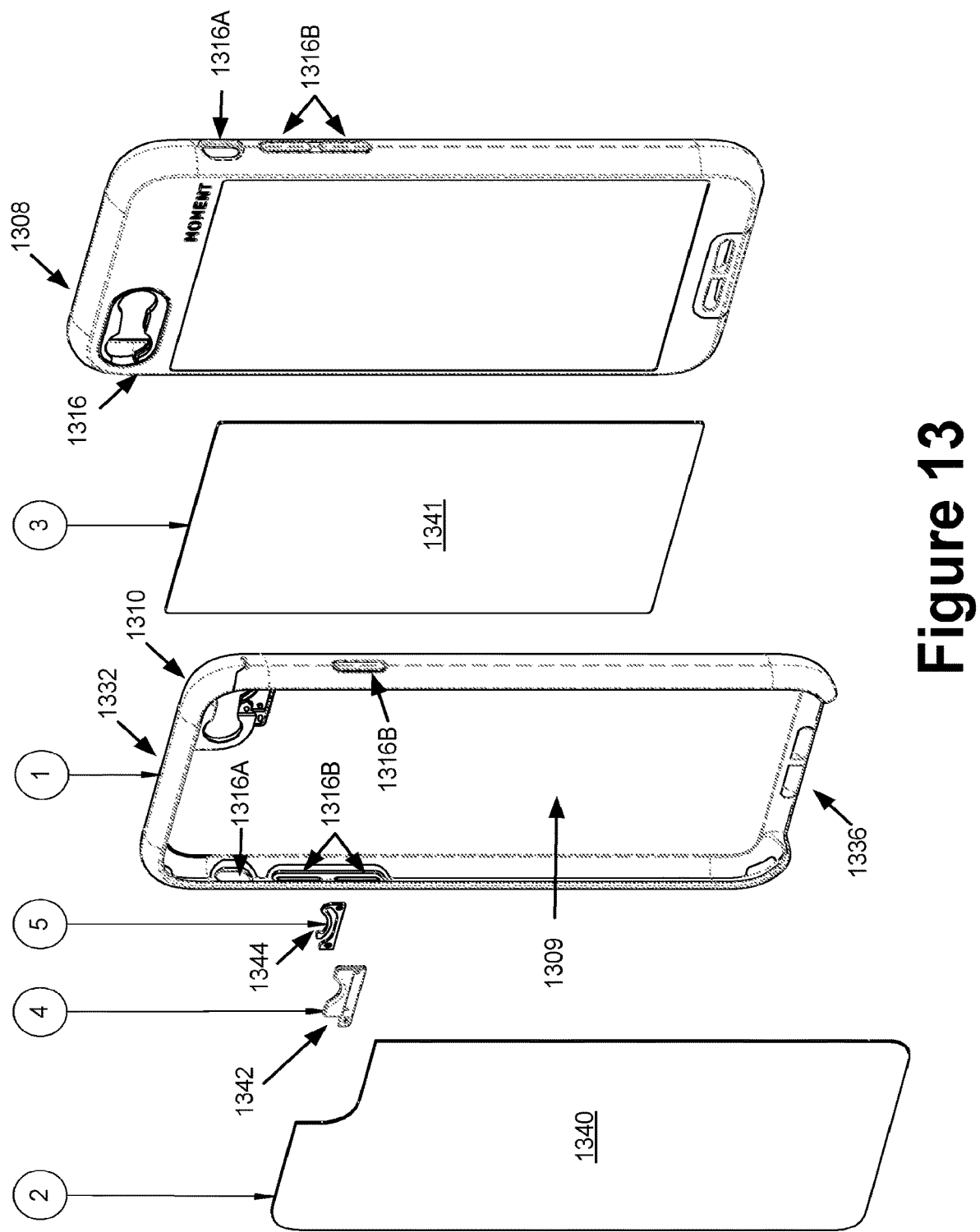
FIG. 13 schematically illustrates an exploded view of a mobile device case in accordance with certain embodiments.

FIG. 13 schematically illustrates an exploded view of a mobile device case 1308 in accordance with another alternative embodiment. A case body 1332 formed from a rigid material such as polycarbonate is configured for bottom insertion as in the examples of FIGS. 9-11. An inner lining 1340 and back plate 1341 are disposed coplanar with front and back surfaces of a back wall of the case body 1332. A capture plate 1342 and spring clip 1344 are utilized in this embodiment to facilitate locking coupling of an auxiliary lens in precise alignment along the optical path of the camera module of the mobile device. The capture plate 1342 and spring clip 1344 are described in more detail with below with reference respectively to FIGS. 14-15 and FIG. 16. The rigid layer component 1332 in the example of FIG. 13 includes two peripheral quasi-buttons 1316A at iphone volume control button locations and two cutouts 1316B defined in opposing long side peripheral walls at iphone switch or button or other actuation control locations.

Figure 14:
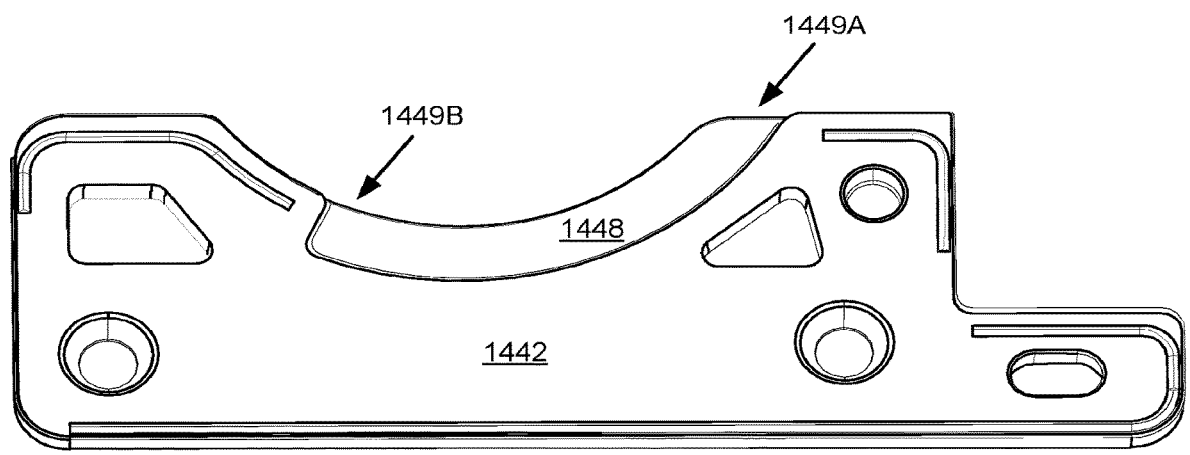
FIG. 14 schematically illustrates a capture plate that includes a gradually-sloped, partial circular segment for coupling an auxiliary lens to a mobile device case in accordance with certain embodiments.

FIG. 14 schematically illustrates a capture plate 1442 that includes a gradually-sloped, partial circular segment 1448 extending for approximately π/2 radians or about 90° in this example, or in a range between approximately π/4 radians or about 45° and approximately 3π/4 radians or about 135° between a first end 1449A and a second end 1449B. An elongated bayonet coupling of an attachable auxiliary lens (see lens 102 of FIGS. 1-2 and/or lens 304 of FIGS. 3-4, as well as U.S. Pat. No. 9,467,608 which is incorporated by reference) may be inserted through a camera-flash aperture 1310, e.g., with an elongated bayonet coupling aligned with the elongated camera flash-aperture 1310 with one end of the bayonet coupling overlapping the partial circular segment 1448 at one end 1449A, and then the bayonet is rotated such that the bayonet end overlapping the gradually-sloped, partial circular segment 1448 of the capture plate 1442 that extends for π/2 radians or about 90° in this example, or in a range between approximately π/4 radians or about 45° and approximately 3π/4 radians or about 135° between a first end 1449A and a second end 1449B, traverses the partial circular segment 1448 as the lens 102, 304 is rotated until it reaches the second end 1449B where the bayonet may be locked by a catch of a spring clip or squeeze-locked in stable optical alignment with the camera module of the device or otherwise becomes disposed in stable equilibrium such as at a recess defined at the second end 1449B of the circular segment 1448. In this example, an auxiliary lens 102, 304 may be securely coupled to a mobile phone case, such as example cases 508, 608, 708, 808, 1108, 1208, or 1308, at a lens attachment aperture and/or at a camera-flash aperture or at a stand-alone camera aperture defined in a back or front wall of an example case for an example mobile phone that has a flash and a camera for illuminating and capturing images of objects and scenes facing the back or front wall, respectively, of a mobile device that has been inserted into the case 508, 608, 708, 808, 1108, 1208, or 1308.

Figure 15:
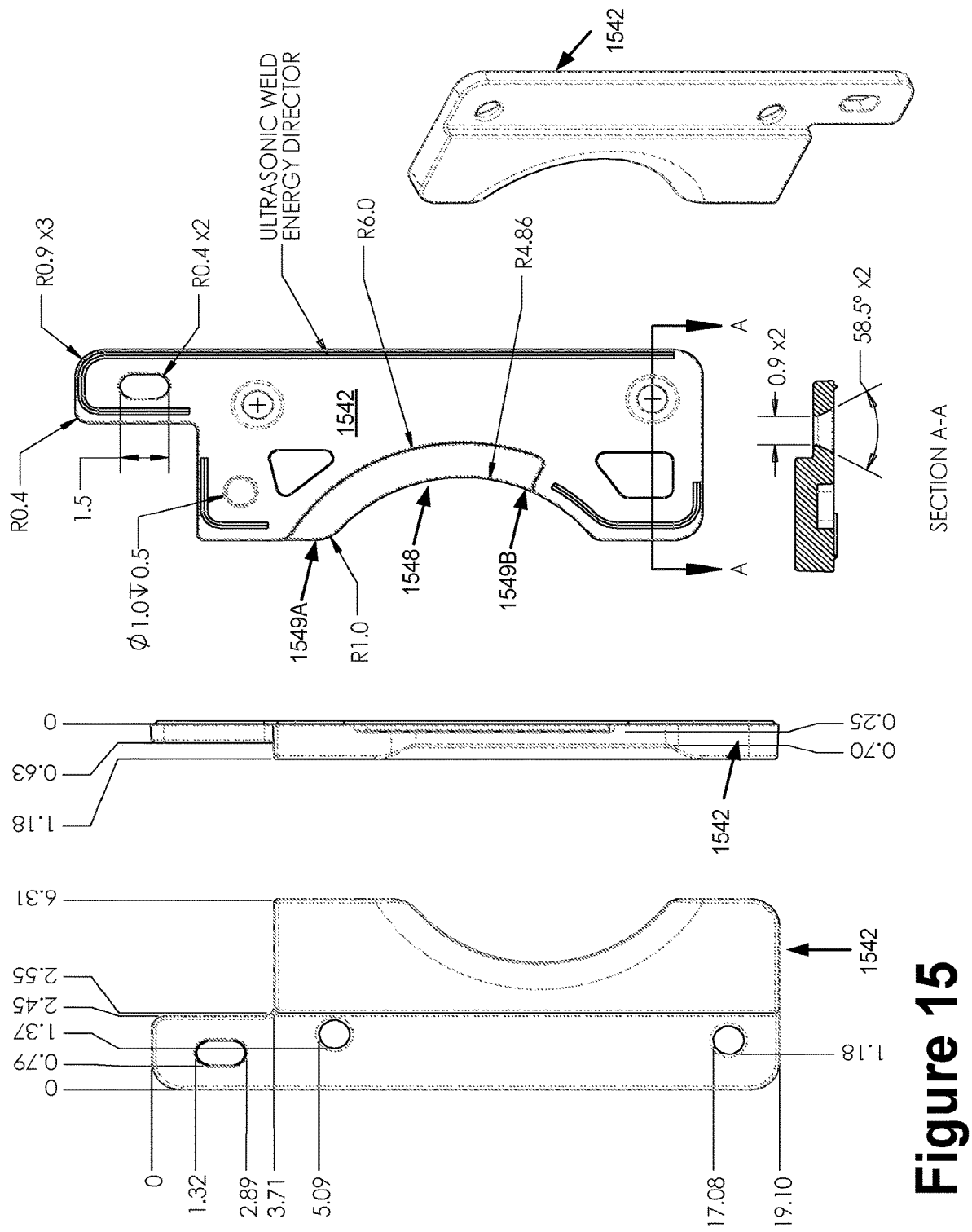
FIG. 15 schematically illustrates top, side, bottom, front and back perspective views of a capture plate for coupling an auxiliary lens to a mobile device case in accordance with certain embodiments.

FIG. 15 schematically illustrates top, side, bottom, front and back perspective views of a capture plate 1542 in accordance with certain embodiments that is configured for facilitating coupling of an auxiliary lens 102, 304 to a mobile device case at a camera-flash aperture defined in the case such that the auxiliary lens is locked into stable alignment along the optical path of a camera module of a mobile device that is inserted into the case for capturing high quality and/or high resolution still and/or video images. The capture plate 1542 may comprise a polycarbonate resin or other rigid material of texture MT-11010 that is approximately 12 mm×6.2 mm×1.2 mm.

Figure 16:
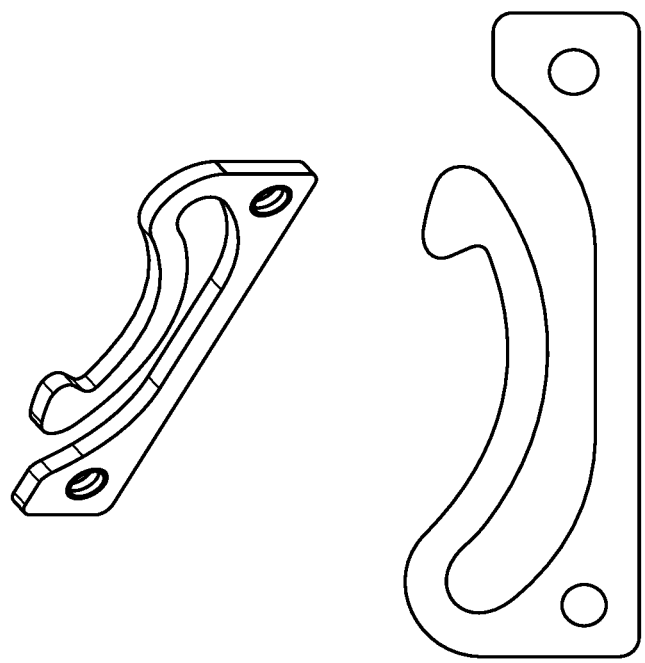
FIG. 16 schematically illustrates top, side, bottom and top perspective views of a spring clip for coupling and locking an auxiliary lens to a mobile device in precise, stable alignment with a camera module of a mobile device inserted within a mobile device case in accordance with certain embodiments.
Figure 16:
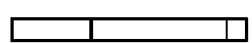
Figure 16:
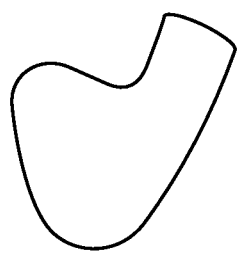
Figure 16:
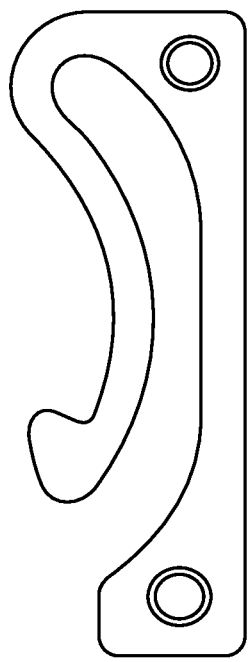

FIG. 16 schematically illustrates top, side, bottom and top perspective views of a spring clip 1644 in accordance with certain embodiments that is configured for facilitating coupling of an auxiliary lens to a mobile device case at a camera-flash aperture defined in the case such that the auxiliary lens is locked into stable alignment along the optical path of a camera module of a mobile device that is inserted into the case for capturing high quality and/or high resolution still and/or video images. The spring clip 1644 includes a catch 1651 that locks a bayonet interface component of an attachable auxiliary lens 102, 304 into stable optical alignment with a camera module of the mobile device to enhance its imaging capability.

Figure 17:
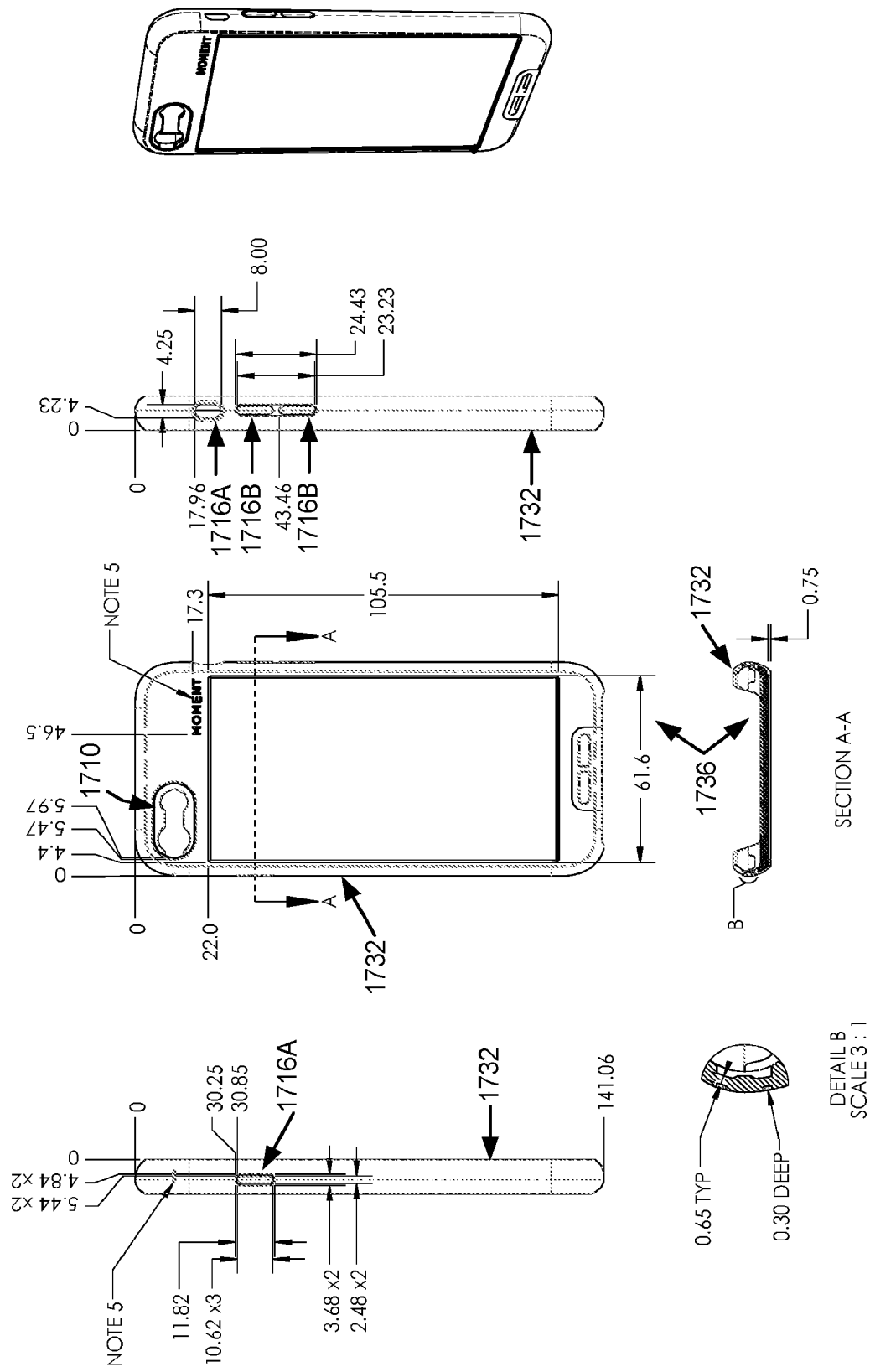
FIG. 17 schematically illustrates left and right side views, a front view, a bottom view and a front perspective view of a rigid material layer component of a mobile device case in accordance with certain embodiments.

FIG. 17 schematically illustrates left and right side views, a front view, a bottom view and a front perspective view of a rigid material layer component 1732 of a mobile device case 1708. A combined auxiliary lens attachment interface and camera flash aperture 1710 is defined within the case 1708 to enhance the camera module of the mobile device for capturing high resolution, quality images. The case in FIG. 17 includes cutouts 1716A for actuating certain switches on the mobile device and a pair of peripheral quasi buttons 1716B for adjusting sound volume up and down on the mobile device. The mobile device may be bottom loaded at an opening defined in a U-shaped peripheral side wall of the rigid component 1732.

Figure 18:
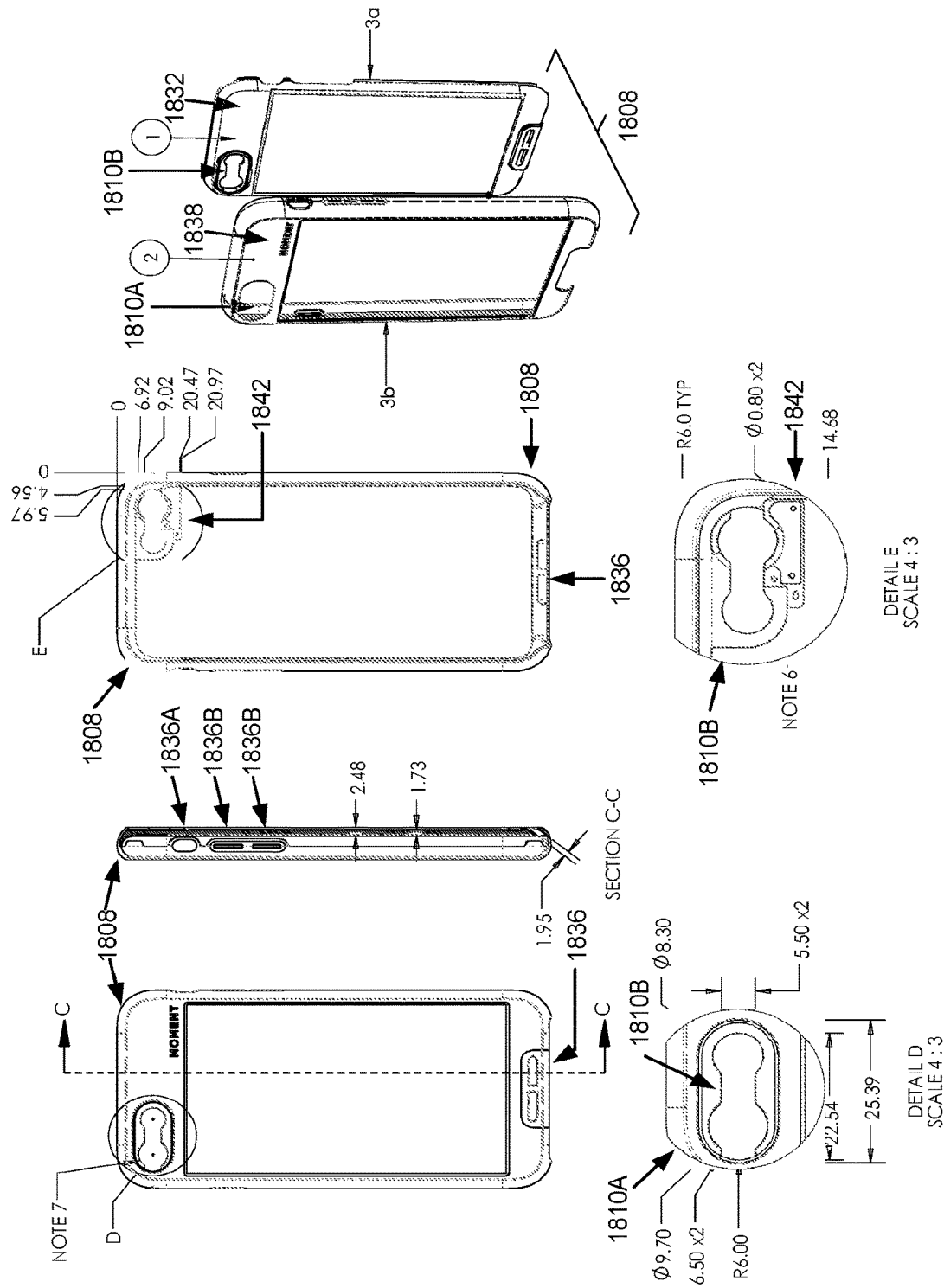
FIG. 18 schematically illustrates a two material layer protective case for a mobile camera-enabled device in accordance with certain embodiments.

FIG. 18 schematically illustrates a two material layer protective case 1808 for a mobile camera-enabled device, such as an android, Samsung or iphone device. The two layer case 1808 includes a rigid inner material layer component 1832 and a soft outer elastomer or other soft material component layer 1838. A camera-flash aperture 1810A is defined in the soft layer 1838 and a camera-flash aperture is also defined in the rigid layer 1832. The rigid layer 1832 is coupled in certain embodiments with a capture plate 1842 and a spring clip 1844, e.g., as described with reference to FIGS. 14-16 and serve to ensure an optically and mechanically stable alignment of the auxiliary lens 102, 304 upon coupling with the protective case 1808 along an optical axis of a built-in camera module of a mobile device that is inserted into the case 1808.

A two material layer case 1808 may be manufactured using a double shot injection molding process to generate the main body of the case. The lens attachment aperture 1810B is already defined in part at its periphery by an integral capture plate 1842 (see FIGS. 14-15) in certain embodiments, or a capture plate 1842 may be coupled at or around the lens attachment aperture periphery during assembly. A spring clip 1844 (see FIG. 16) may now be heat staked into place or coupled in its position just behind the capture plate 1842. The spring clip 1844 includes a catch 1851 that locks the bayonet interface into place at an endpoint 1849B after rotating along the gradually-sloped circular segment 1848 for 30-150° from starting at 1849A in elongated alignment with the camera-flash aperture 1810A, 1810B. After heat staking the spring 1844 into its place protruding from a peripheral edge of the camera-flash interface opening 1810B and overlapping an insertion path of a bayonet interface end, a plastic capture plate 1842 is ultrasonically welded in overlapping juxtaposition of the spring clip 1844. In certain embodiments, an inner lining 1340 and back plate 1341 of the example of FIG. 13 are adhered to the rigid material layer 1832 which is then coupled to or over-molded with or fastened together by interlocking protrusions or clipped or screwed or snapped together to form the two material layer case 1808

A mobile device case in accordance with described and alternative embodiments may optionally include a wireless Bluetooth antenna or electrical power and/or data coupling interface for communicating with the mobile device or receiving battery power from the mobile device to run certain straight-forward tasks involving alignment or calibration or identification of an attached auxiliary lens, e.g., in an embodiment that includes a MEMS actuator, a piezoelectric actuator, or a voice coil motor actuator for adjusting the auxiliary lens along the optical axis of the camera module of the mobile device. The case may draw power from a wall outlet separate from plugging in the mobile device or both may be powered by a single plug into a wall outlet or the mobile device may be allowed to become fully charged before the case may utilize the power from the wall outlet.

Several embodiments have been described herein that include one or two or more material layer components that are over-molded or co-molded or single or double shot injection molded or otherwise interlocked or coupled together to form a one-piece mobile device case. In alternative embodiments, two or more sections may snap together to assemble the case after insertion of the mobile device, such that these alternative embodiments do not have a bendable zone 512, 612, 712 nor an opening 936, 1036, 1136, 1336, 1736, 1836 in the bottom peripheral wall nor in the top or side peripheral walls for the purpose of inserting the mobile device into the case either at the bendable zone or through the opening in the peripheral wall.

In certain embodiments, a connector may be provided to pass audio from the mobile device to an external sound system or head set and/or to pass electric power through to charge the mobile device, e.g., including an apple LAM product.

In certain embodiments, the snugness of the form fit of the recess 509, 909, 1309 in the single material layer case 508 or in a rigid material layer component 932, 1332, e.g., of a multi-layer case 1308 serves to secure the mobile device without an additional inner soft layer component, nor any springs, latches nor cushions disposed between the mobile device and the rigid layer component 932, 1332, although one or more of these may be included in alternative embodiments.

Several embodiments have been described that define an opening in the front for direct user touch access to a touch screen interface of an inserted mobile device and/or a camera-flash opening, e.g., 1310, and/or cutouts, e.g., 1316B, such that a case in accordance with these embodiments is neither pressure controlled, nor water tight nor air tight. In alternative embodiments, one or more thin membranes may be provided across one or more openings or cutouts to waterproof the device while still permitting user interface access and/or transmission of light.

A rigid material layer component of a case in accordance with certain embodiments may include polycarbonate, e.g., Sabic Lexan EXL1414, or a polycarbonate/PBT material blend, e.g., Sabic Xenoy ENH2900 or Sabic Valox 357U. A soft material layer component of a case in accordance with certain embodiments may include a thermoplastic such as a TPE or a TPU, e.g., P.R.C. 46 Series TPU Shore 80A, or a TPU/Silicone blend, e.g., TPSiV 3541 Shore 80A. A capture plate component of a case in accordance with certain embodiments may include same or similar materials as the rigid component, including polycarbonate, e.g., Sabic Lexan EXL1414, or a polycarbonate/PBT material blend, e.g., Sabic Xenoy ENH2900 or Sabic Valox 357U. PC and/or TPE surfaces may have MT-11010 and/or MT-11020 texture. An overall dimension of a case may be approximately 140 mm×68 mm×11 mm, and the case size and shape can be adjusted to fit the size and shape of the particular mobile device that will be inserted and protected by the case.

In certain embodiments, a capture plate may be heat staked in place relative to the camera-flash aperture and/or lens attachment aperture, and a spring clip may be ultrasonically welded. For example, case assembly may include locating a spring clip using bosses on a case body, heat staking bosses to permanent assemble spring clip into place, and covering spring clip with capture plate and ultrasonically welding for permanent assembly, while an example process in accordance with the embodiment of FIG. 13 may also include removing a backer and applying an inner lining using double sided adhesive and removing a backer and applying a back plate using double sided adhesive. In certain embodiments, two or more locating pins may be used to accurately locate the spring clip before heat staking and ultrasonic welding of the capture plate. Alternatively, vibration welding, laser welding, hot plate welding, spin welding ultrasonic welding or infrared welding or another thermal process may be employed to couple the capture plate and/or the spring clip at the lens attachment aperture edge, or the capture plate and/or spring clip may be formed or molded together with the case or with a case material layer component using an integrated shape and configuration at an edge of a lens attachment aperture and/or camera-flash aperture.

We claim:

1. A mobile camera system, comprising:
    a camera enabled mobile device including a miniature camera module embedded within the mobile device including a built-in lens and an image sensor for capturing digital images;
    a mobile device processor configured for processing the digital images;
    a mobile device display for viewing the digital images;
    a case coupled around the camera-enabled mobile device, wherein said case comprises:
    a housing defining a camera-lens aperture and a touchscreen display aperture, said housing being configured to securely couple around at least a portion of the periphery of said mobile device; and
    a lens attachment interface comprising
    a capture plate comprising a detent segment protruding into the camera-lens aperture across at least a portion of a periphery of the camera-lens aperture sufficient to overlap a bayonet tab of a coupling interface of a removable lens assembly along an optical path of the miniature camera module, and
    a catch comprising a spring clip or a recess trap or a combination thereof to automatically prevent backward rotation and thereby to facilitate automatic stable locking coupling upon forward rotation of the removable lens assembly including moving said bayonet tab along said detent segment between a starting orientation and a final stable orientation engaged with said catch in optical alignment with said miniature camera module.

2. The mobile camera system of claim 1, wherein said coupling interface comprises a bayonet tab and the capture plate comprises a gradually-sloped detent segment configured to overlap the bayonet tab at a first end of the detent segment, wherein the catch comprises a spring or recess trap or combination thereof disposed at a second end of the detent segment, and said bayonet tab is rotatable between said first and second ends of said detent segment to engage said catch and facilitate said stable locking coupling.

3. The mobile camera system of claim 2, wherein said catch comprises a spring clip.

4. The mobile camera system of claim 2, wherein said detent segment of the capture plate between said first and second ends for rotation of said bayonet tab therethrough comprises between 45° and 135°.

5. The mobile camera system of claim 1, wherein said coupling interface comprises a compression bud and said capture plate comprises a bottleneck configured to overlap a periphery of the compression bud, and said compression bud is compressible to penetrate the bottleneck and decompressible after the bottleneck to facilitate said stable locking coupling.

6. The mobile camera system of claim 1, wherein said lens coupling interface comprises a snap component and the capture plate comprises a complementary snap component configured to stably couple with said snap component of said coupling interface to facilitate said stable locking coupling.

7. The mobile camera system of claim 1, wherein said coupling interface comprises a feedthrough component and the capture plate comprises a complementary feedthrough receiver component configured to stably couple with said coupling interface to facilitate said stable locking coupling.

8. The mobile camera system of claim 1, wherein the capture plate comprises polycarbonate resin or a rigid material of texture MT-11010 or both.

9. The mobile camera system of claim 1, wherein an inner edge of case material that defines the periphery of the camera-flash aperture comprises a dark color.

10. The mobile camera system of claim 1, wherein said case housing uniformly comprises a case material with said same dark color as said inner edge of said lens attachment aperture.

11. The mobile camera system of claim 1, wherein said case housing comprises a soft outer material layer and a rigid inner material layer, and said camera-lens aperture comprises a uniform cutout from said soft outer material layer of said case housing, and said lens attachment interface comprises a bevel.

12. The mobile camera system of claim 1, wherein said lens attachment interface comprises polycarbonate.

13. The mobile camera system of claim 1, wherein the case housing is further configured to define therein said lens attachment interface.

14. The mobile camera system of claim 1, wherein the camera-lens aperture is further shaped to couple a lens attachment interface with the case.

15. The mobile camera system of claim 1, wherein the camera-lens aperture is shaped to integrally include a lens attachment interface.

16. The mobile camera system of claim 1, further comprising an auxiliary optical assembly coupled to said lens attachment interface, wherein said auxiliary optical assembly comprises: a removable lens assembly including a lens holder, a lens coupled to the lens holder, and a coupling interface.

17. The mobile camera system of claim 16, wherein the auxiliary lens assembly further comprises a hood coupled to or integral with the lens holder and extending away from an object side of the lens.

18. The mobile camera system of claim 16, wherein a cross-section of the hood increases linearly or uniformly in diameter, area or distance, or combinations thereof, with distance away from the object side of the lens holder.

19. The mobile camera system of claim 16, wherein said hood comprises a first hood section beginning at an object end of said lens holder and a second hood section beginning at an object end of said first hood section between about a tenth and a half of the total hood height, wherein said first and second hood sections define an aperture that gradually increases with distance away from the object side of the lens within said first hood section.

20. The mobile camera system of claim 16, wherein said hood which exhibits a rounded body shape and comprises flat or smooth glass.

21. The mobile camera system of claim 1, wherein the housing comprises a soft thermoplastic material and the auxiliary lens interface comprises a hard polycarbonate material.

22. The mobile camera system of claim 1, further comprising a rechargeable case battery that is disposed in a battery compartment defined in the case housing and configured to power the mobile device when the mobile device is low on battery power or is out of battery power.

23. The mobile camera system of claim 1, wherein the rechargeable battery is connected to an interface that is connectable to an external power source across which data may be communicated.

24. The mobile camera system of claim 1, further comprising a case processor and electrical circuitry embedded within the housing and configured to detect the presence of the auxiliary optical assembly coupled to the lens attachment interface.

25. The mobile camera system of claim 24, wherein the case processor and electrical circuitry and further configured to be programmable by a software application in accordance with a lens recognition process, selectable pre-capture settings or post-capture image editing or combinations thereof.

26. The mobile camera system of claim 1, wherein the rechargeable battery is further configured to power a case processor and electrical circuitry embedded within the case connector.

* * * * *